(12) United States Patent
Li et al.

(10) Patent No.: US 10,489,095 B2
(45) Date of Patent: Nov. 26, 2019

(54) METHOD AND SYSTEM FOR BINDING USER ACCOUNT TO IMAGING DEVICE BY MOBILE TERMINAL

(71) Applicant: ZHUHAI PANTUM ELECTRONICS CO., LTD., Guangdong (CN)

(72) Inventors: Jiade Li, Zhuhai (CN); Jian Wang, Shenzhen (CN); Shaohua She, Shenzhen (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 15/537,951

(22) PCT Filed: Dec. 15, 2015

(86) PCT No.: PCT/CN2015/097373
§ 371 (c)(1),
(2) Date: Jun. 20, 2017

(87) PCT Pub. No.: WO2016/107400
PCT Pub. Date: Jul. 7, 2016

(65) Prior Publication Data
US 2017/0344321 A1 Nov. 30, 2017

(30) Foreign Application Priority Data
Dec. 30, 2014 (CN) .......................... 2014 1 0851280

(51) Int. Cl.
*G06F 3/048* (2013.01)
*G06F 3/12* (2006.01)
(Continued)

(52) U.S. Cl.
CPC ......... *G06F 3/1238* (2013.01); *G06K 7/1417* (2013.01); *H04N 1/00233* (2013.01); *H04N 1/00307* (2013.01)

(58) Field of Classification Search
CPC .................................... G06F 3/1238; G06K 7/1417; H04N 1/00851; H04N 1/00127; H04N 1/32771
(Continued)

(56) References Cited

U.S. PATENT DOCUMENTS 8,902,454 B2  12/2014 Liu et al.
9,521,277 B1 * 12/2016 Johnson ............. H04N 1/00315
(Continued)

FOREIGN PATENT DOCUMENTS

CN  102208053 A  10/2011
CN  103347079 A  10/2013
(Continued)

OTHER PUBLICATIONS

China Intellectual Property Organization (SIPO) Search Report for 2014108512807 dated Apr. 13, 2017 2 Pages.
(Continued)

*Primary Examiner* — Jamares Q Washington
(74) *Attorney, Agent, or Firm* — Anova Law Group, PLLC (57) ABSTRACT

The present disclosure discloses a method and a system for binding user account to imaging device by mobile terminal. The method comprises: scanning a two-dimensional code, by a mobile terminal; decoding the two-dimensional code, by the mobile terminal, to acquire decoded information comprising imaging device information; sending a user account to a server, by the mobile terminal; binding, by the server, an imaging device corresponding to the imaging device information to the user account, according to the user account received from the mobile terminal and the imaging device information acquired by the mobile terminal using the two-dimensional code; and executing, by the mobile terminal, a printing task using the imaging device bound to the user account.

18 Claims, 5 Drawing Sheets

(51) Int. Cl.
*G06K 7/14* (2006.01)
*H04N 1/00* (2006.01)

(58) Field of Classification Search
USPC ........................................................ 358/1.15
See application file for complete search history.

(56) References Cited

U.S. PATENT DOCUMENTS

| | | | | |
|---|---|---|---|---|
| 2007/0124436 A1* | 5/2007 | Shepherd | ............... | G06F 3/1226 |
| | | | | 709/223 |
| 2011/0085196 A1* | 4/2011 | Liu | ............... | G06F 3/1204 |
| | | | | 358/1.15 |
| 2011/0173311 A1* | 7/2011 | Vaughan | ............... | H04L 12/66 |
| | | | | 709/223 |
| 2012/0250065 A1* | 10/2012 | Partridge | ............... | G06F 21/608 |
| | | | | 358/1.14 |
| 2014/0298293 A1* | 10/2014 | Nishio | ............... | G06F 8/30 |
| | | | | 717/121 |

FOREIGN PATENT DOCUMENTS

| | | |
|---|---|---|
| CN | 103412730 A | 11/2013 |
| CN | 103870988 A | 6/2014 |
| CN | 103942016 A | 7/2014 |
| CN | 104092644 A | 10/2014 |
| CN | 104092757 A | 10/2014 |
| CN | 104618622 A | 5/2015 |
| EP | 2264588 A3 | 1/2012 |
| JP | 2011180642 A | 9/2011 |

OTHER PUBLICATIONS

The World Intellectual Property Organization (WIPO) International Search Report For PCT/CN2015/097373 dated Mar. 14, 2016 4 Pages.

* cited by examiner

METHOD AND SYSTEM FOR BINDING USER ACCOUNT TO IMAGING DEVICE BY MOBILE TERMINAL

CROSS-REFERENCES TO RELATED APPLICATIONS

This application is a national stage patent application of PCT application No. PCT/CN2015/097373, filed on Dec. 15, 2015, which claims priority to Chinese patent application No. 201410851280.7, entitled "METHOD AND SYSTEM FOR BINDING USER ACCOUNT TO IMAGING DEVICE BY MOBILE TERMINAL", and filed with the State Intellectual Property Office of People's Republic of China on Dec. 30, 2014, the entire content of all of which is herein incorporated by reference.

FIELD OF THE DISCLOSURE

The present disclosure relates to the technical field of imaging, and more specifically, relates to a method and a system for binding user account to imaging device by mobile terminal.

BACKGROUND

Nowadays, various imaging devices, such as printers, copiers, scanners, fax machines, or multi-function machines with integrated functions, are increasingly used in daily life, and users demand more and more for printing modes and diversity.

For example, more and more users expect to complete a printing task through a mobile terminal, which requires the mobile terminal to pre-bind with an imaging device before printing.

In the existing methods of binding a mobile terminal such as a mobile phone to an imaging device, when an application (app) required for printing is not installed in the mobile phone, the user may have to manually input the corresponding Uniform Resource Locator (URL) information through a browser, download and install the app, then bind the mobile phone to the printer through the downloaded app.

When an app required for printing has been installed in the mobile phone, the user often logs in to a user account on the network through the mobile app, then manually enters various information of the imaging device to be bound, such as device code, device model, device properties (e.g., print speed, print resolution), and device function (e.g., whether or not support color printing), etc.

It can be seen that, the existing network imaging devices, when being bound with the user account, require the user to manually enter a lot of information, and even manually enter the URL information to download the App. These complicated and professional input steps and a lot of user input bring great inconvenience to the users.

BRIEF SUMMARY OF THE DISCLOSURE

In view of this, the present disclosure provides a method and a system for binding user account to imaging device by mobile terminal.

One of the technical problems to be solved by the present disclosure is to provide a method and system for binding user account to imaging device by mobile terminal, in which the method and system are capable of improving at least one of user convenience and security.

To solve one or more technical problems set forth, the present disclosure provides a method for binding user account to imaging device by mobile terminal, comprises:

scanning a two-dimensional code, by a mobile terminal;
decoding the two-dimensional code, by the mobile terminal, to acquire decoded information comprising imaging device information;
sending a user account to a server, by the mobile terminal;
binding, by the server, an imaging device corresponding to the imaging device information to the user account, according to the user account received from the mobile terminal and the imaging device information acquired by the mobile terminal using the two-dimensional code; and
executing, by the mobile terminal, a printing task using the imaging device bound to the user account.

Further, the method also includes: after decoding the two-dimensional code, by the mobile terminal, to acquire the decoded information comprising the imaging device information, based on the decoded information, automatically starting or downloading an imaging app for executing a printing task, and presenting a login interface to the user; and when the mobile terminal sends the user account to the server, sending, by the imaging app in the mobile terminal, the user account to the server when the user is logging in.

In addition, scanning a two-dimensional code, by a mobile terminal further includes: starting an imaging app in the mobile terminal; and starting a two-dimensional code scanning function module in the imaging app to scan the two-dimensional code.

In addition, the imaging device information includes at least one of a device name, a device number, a print speed, a print resolution, a supported print mode, and at least includes a device number.

In addition, decoding the two-dimensional code, by the mobile terminal, to acquire decoded information comprising imaging device information further includes: decoding the two-dimensional code, by the mobile terminal, to obtain encrypted imaging device information; and decrypting the encrypted imaging device information to obtain decrypted imaging device information.

Further, the method also includes: after sending the user account to the server by the mobile terminal, triggering, by a user click, an imaging app in the mobile terminal to transmit a binding request to the server; or automatically transmitting, by the imaging app in the mobile terminal, a binding request to the server.

In addition, binding, by the server, an imaging device corresponding to the imaging device information to the user account further includes: in response to the binding request, binding the imaging device corresponding to the imaging device information to the user account, according to the user account received from the mobile terminal and the imaging device information acquired from the two-dimensional code, wherein the binding request includes the imaging device information acquired from the two-dimensional code.

In addition, binding, by the server, an imaging device corresponding to the imaging device information to the user account further includes: in response to the binding request, sending, by the server, an instruction to acquire the imaging device information to the mobile terminal; in response to the instruction, sending, by the mobile terminal, the imaging device information obtained from decoding the two-dimensional code to the server; and after receiving, by the server, the imaging device information, binding the imaging device corresponding to the imaging device information to the user account, according to the user account received from the mobile terminal and the imaging device information.

Further, the method also includes: decoding the two-dimensional code, by the mobile terminal, to obtain an URL for downloading an imaging app; and based on the URL, downloading the imaging app.

Further, based on the URL, downloading the imaging app, also includes: after obtaining the URL from decoding the two-dimensional code by the mobile terminal, automatically downloading the imaging app based on the URL, wherein the URL directs to a web page prompting to download the imaging app, or to a downloading address of the imaging app.

Further, the method also includes: decoding the two-dimensional code, by the mobile terminal, to obtain automatic detection information for detecting whether the imaging app has been installed on the mobile terminal or whether the installed imaging app is a latest version; based on the automatic detection information, detecting, by the mobile terminal, at least one of whether the imaging app has been installed on the mobile terminal and whether the installed imaging app is the latest version; and after determining the imaging app has not been installed or the installed imaging app is not the latest version, downloading the imaging app based on the URL.

Another aspect of the present disclosure provides a system for binding user account to imaging device by mobile terminal, comprising at least one mobile terminal, a server and at least one imaging device, wherein the server is coupled to the at least one imaging device through a data connection and, meanwhile, coupled to the at least one mobile terminal through a data connection, wherein:

the at least one mobile terminal is configured to scanning a two-dimensional code;

the at least one mobile terminal is configured to decode the two-dimensional code, to acquire decoded information comprising imaging device information;

the at least one mobile terminal is configured to send a user account to the server;

based on the user account received from the at least one mobile terminal and the imaging device information acquired from the two-dimensional code by the at least one mobile terminal, the server is configured to bind the at least one imaging device corresponding to the imaging device information to the user account; and the at least one mobile terminal is configured to execute a printing task using the at least one imaging device bound to the user account.

Compared with the prior art, in the disclosed embodiments, when binding the user account to the imaging device, the account may be conveniently associated and/or the app may be download without manually inputting a large amount of information by the user, thereby improving the user friendliness.

In addition, when binding the user account to the imaging device based on the disclosed method or system, the system security may be improved, which may be especially important to some applications that have high security requirements for the printing task.

Other advantages, objects, and features of the invention will be set forth in part in the description which follows and, to some extent, will be apparent to those skilled in the art based on the study of the present disposure, or leant from the practice of the present invention. The objectives and other advantages of the invention may be realized and attained by the structure particularly pointed out in the following specification, claims, and drawings.

BRIEF DESCRIPTION OF THE DRAWINGS

The accompanying drawings are provided for further understanding of the present disclosure, and constitute a part of the description for interpreting the present disclosure together with the examples of the present disclosure, rather than limiting the present disclosure. In the accompanying drawings.

DETAILED DESCRIPTION

The embodiments of the present disclosure will be illustrated in detail below in conjunction with the accompanying drawings and examples, and thereby an implementation process using technical means of the present disclosure for solving the technical problems and achieving technical effects may be fully understood and implemented. It should be noted that respective examples of the present disclosure and various technical features in respective examples may be combined with one another as long as no conflicts exist, and all the formed technical solutions are within the protection scope of the present disclosure.

It should be noted that the steps illustrated in the flow charts can be executed in, such as a computer system including a set of computer-executable instructions. Further, although the steps illustrated in the flow charts are illustrated in a sequential manner, the steps may also be performed in another order different from the illustrated order in the flow charts.

Currently, two-dimensional codes are mainly used for storing URL information, thereby facilitating the user to access the URL. The present disclosure introduces the two-dimensional code to bind the user account in the imaging field to the imaging device. Certain knowledge of two-dimensional codes will be explained first.

A two-dimensional code is a black and white pattern that is distributed on a plane (two-dimensional direction) in a certain geometric pattern, and is configured to record data, symbols, and other information. In the code instrumentation, based on the concept of "0" and "1" bitstreams, which builds the internal logic of the computer, several geometries corresponding to binary are adopted to represent the text numerical information, which can be automatically read by an image input device or a photoelectric scanning device to realize an automatic processing of information. Two-dimensional codes are featured with fast reading, and all-round reading compatibility, etc.

Mobile two-dimensional code is an application of two-dimensional code technology in mobile phones. Mobile two-dimensional code is a two-dimensional code, in which the information to be accessed and used by the mobile phone is encoded into a two-dimensional code, which is recognized by the camera of the mobile phone through capturing an image of the two-dimensional code. Mobile two-dimensional codes may be printed in newspapers, magazines, advertisements, books, labels, business cards, a variety of packages, and other carriers. Through scanning the two-dimensional code by the camera of the mobile phone or entering the number, or keywords, etc. corresponding to the two-dimensional code, the user will be provided with fast Internet access or wireless communication. For example, the user may be able to easily and quickly browse the web, download graphics, download or play music online, download apps, participate in lucky draw or acquire product information, etc. The user may also be able to wirelessly communicate with other clients or servers. In this process, URL or device codes may be no longer input in the mobile phone.

However, the existing two-dimensional code often contains limited information and, thus, the applications are rather limited. Generally, the information contained in the existing two-dimensional code is only for URLs. Moreover, the URL and other information contained in the existing two-dimensional code has not been encrypted yet, which means hidden trouble in the information security.

First Embodiment

The first embodiment provides a method for binding a user account to an imaging device by (scanning or capturing) a two-dimensional code. In the disclosed method, complicated input operations, such as inputting URL, device code, device model, device properties, and device function, etc. may be eliminated, which may facilitate the user operation, improve the operation efficiency of the two-dimensional code, and promote the applications of two-dimensional code technology in mobile phones or other types of mobile terminals. In addition, the disclosed method may also enhance the security of wireless communication through scanning the two-dimensional code, as well as, the security of the information related to the imaging device.

Figure 5:
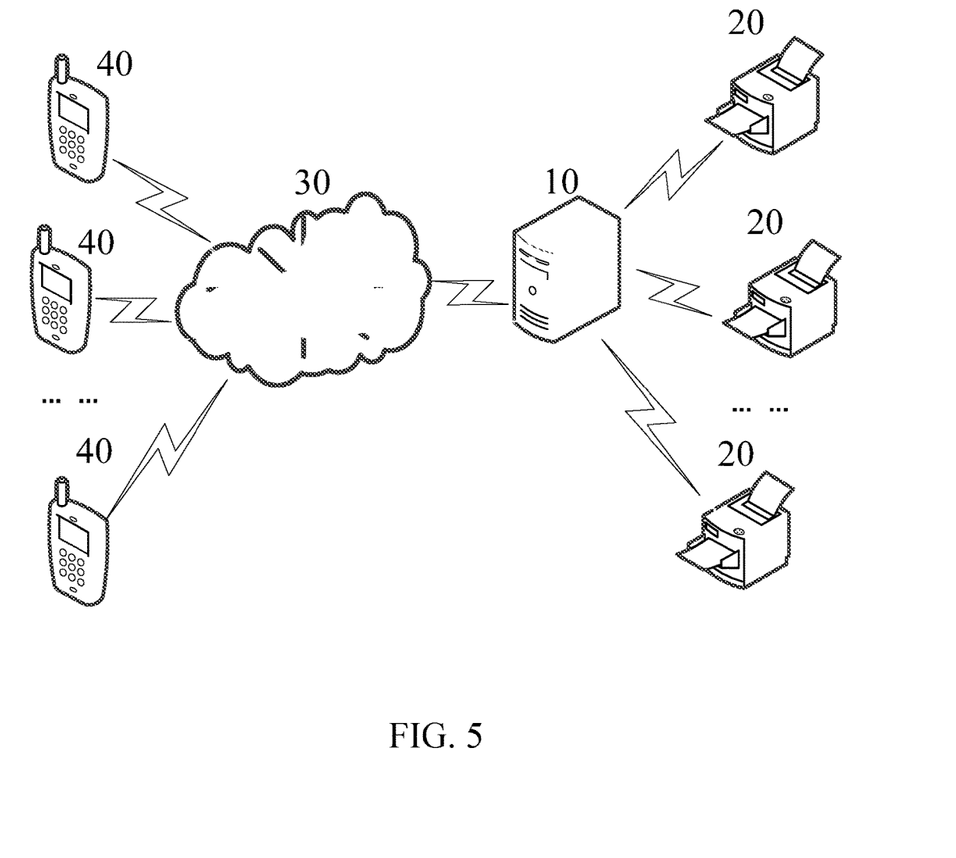
FIG. 5 illustrates an exemplary system for binding a user account to an imaging device consistent with disclosed embodiments.

In the disclosed embodiments, as shown in FIG. 5, in an exemplary system for binding a user account to an imaging device, a network may include a server 10 connected to at least one imaging device 20 through a network connection/data connection and, meanwhile, connected to at least one mobile terminal 40 through a network connection/data connection. The imaging device 20 and the mobile terminal 40 may be connected to the server 10 through an Internet 30. Through the mobile terminal 40 and the server 10, the user may be able to control the imaging device 20 bound to the mobile terminal 40 to perform a remote printing any time.

The mobile terminal 40 may scan the two-dimensional code to acquire the post-decoding information including the imaging device information, and the mobile terminal 40 may transmit the acquired post-decoding information including the imaging device information to the server 10 connected thereto. The server 10 may bind the user account and the imaging device 20 corresponding to the acquired imaging device information. Thus, the mobile terminal 40 may be able to perform the imaging task through the bound imaging device 20.

Figure 1:
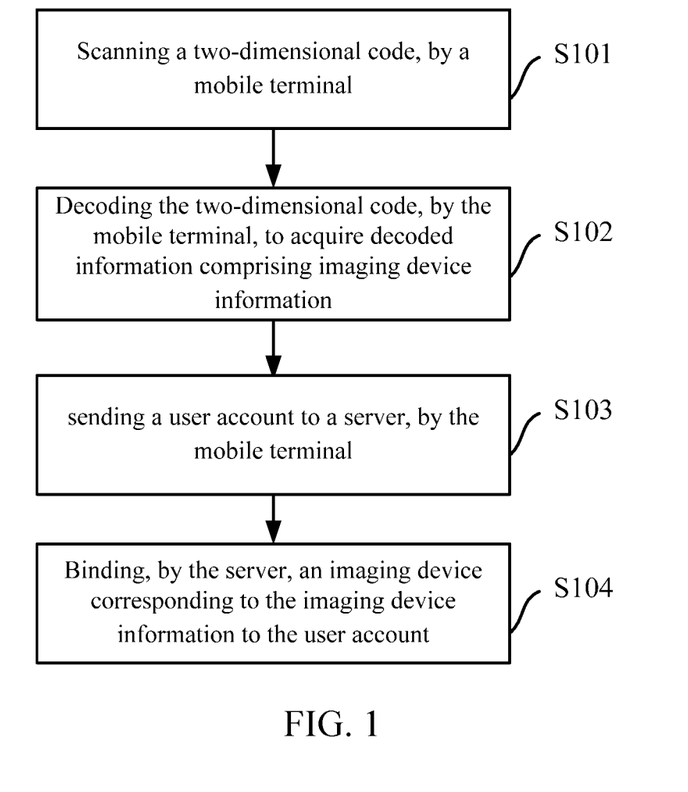
FIG. 1 illustrates a flow chart of an exemplary method for binding user account to imaging device by mobile terminal consistent with disclosed embodiments.

FIG. 1 illustrates a flow chart of an exemplary method for binding the user account to the imaging device 20 by the mobile terminal 40 according to the first embodiment. The method will be illustrated in detail below in conjunction with the accompanying FIG. 1.

Step 101, the mobile terminal 40 scans the two-dimensional code.

In particular, the mobile terminal 40 may scan the two-dimensional code on the imaging device 20 by a two-dimensional code scanning program. The mobile terminal 40 may include, for example, a mobile phone, a smart phone, a tablet, a laptop, a personal digital assistant (PDA), an onboard computer, or other wireless devices capable of wireless communication.

The two-dimensional code scanning program may be provided by the mobile terminal 40 itself, such as included in an app (referred to as an imaging application or an imaging app) installed on the mobile terminal 40 for performing a printing task, or may be provided by other third party applications. The two-dimensional code may be printed directly on the imaging device 20, or may be printed on the label affixed to the imaging device 20, or may be sprayed onto the imaging device 20 by ink jet techniques, or may be visibly displayed on the imaging device 20 through other approaches.

Step S102, the mobile terminal 40 decodes the two-dimensional code to acquire the imaging device information. Through a two-dimensional code parsing program included in the system of the mobile terminal 40, the mobile terminal 40 may decode the scanned two-dimensional code by an encryption/decryption algorithm, to obtain the information contained in the two-dimensional code, such as the device code, device model, device properties (e.g., print speed, print resolution, etc.) and device functions of the imaging device 20, and temporarily save the obtained device information in the cache of the mobile terminal 40. In another embodiment, the information obtained by decoding the scanned two-dimensional code may also be saved as a file in the memory of the mobile terminal 40.

Step S103, the mobile terminal 40 transmits a user account to the server 10.

In one embodiment, the mobile terminal 40 may decode the two-dimensional code, then identify the imaging device information contained in the two-dimensional code. According to the imaging device information contained in the two-dimensional code, an imaging app for executing the printing task may be automatically started, and a login interface may be presented to the user. The user may log in to the server 10 using the account and password registered in advance on the server 10. When signing in to the server 10, the imaging app in the mobile terminal 40 may transmit the user account to the server 10, which is connected to the imaging device 20. In addition, the two-dimensional code may also include a download link of the imaging app. Accordingly, after decoding the two-dimensional code, the mobile terminal 40 may identify the decoded information, such as the imaging device information contained in the two-dimensional code, as well as the download link of the imaging app. Then, according to the information contained in the two-dimensional code image, the imaging app for executing the printing task may be automatically downloaded and started, and the login interface may be presented to the user.

In another embodiment, the imaging app may be manually started by the user before or after the mobile terminal 40 decodes the two-dimensional code. That is, the log in step may also be performed before or after scanning the two-dimensional code.

For example, the imaging app may be run (manually or automatically) before scanning the two-dimensional code. The imaging app in the mobile terminal 40 may be started and the user may log in to the server 10 (or log in to the server 10 after the two-dimensional code is scanned). A two-dimensional code scanning function module may be manually started to scan the two-dimensional code.

Step S104, the server 10 binds the imaging device 20 corresponding to the imaging device information to the user account, according to the user account received from the mobile terminal 40 and the imaging device information acquired from the two-dimensional code.

In particular, after the imaging app in the mobile terminal 40 sends the user account to the server 10, for example, after the mobile terminal 40 acquires the imaging device information contained in the two-dimensional code and the user logs in to the server 10 or after the user logs in to the server 10 and manually executes the two-dimensional code scanning operation, the imaging app may automatically send a binding request to the server 10 (for example, the cloud server 10). The binding request may include the acquired imaging device information. After receiving the binding request, the server 10, in response to the binding request, may bind the imaging device 20 corresponding to the imaging device information to the user account, according to the user account received from the mobile terminal 40 and the imaging device information acquired from the two-dimensional code. At this moment, optionally, the imaging app may be automatically redirected to a page performing the binding processing. In another embodiment, the user may manually submit a binding request to the cloud server 10 by pressing a menu or a button or the like. That is, the mobile terminal 40 may be triggered, by a user click, to transmit the binding request to the server 10. In another embodiment, the imaging app in the mobile terminal 40 may automatically send a binding request to the server 10.

Thus, the mobile terminal 40 may perform a printing task with the imaging device 20 bound to the user account.

Binding may refer to establishing a correspondence relationship between the imaging device 20 and the user account.

Figure 4:
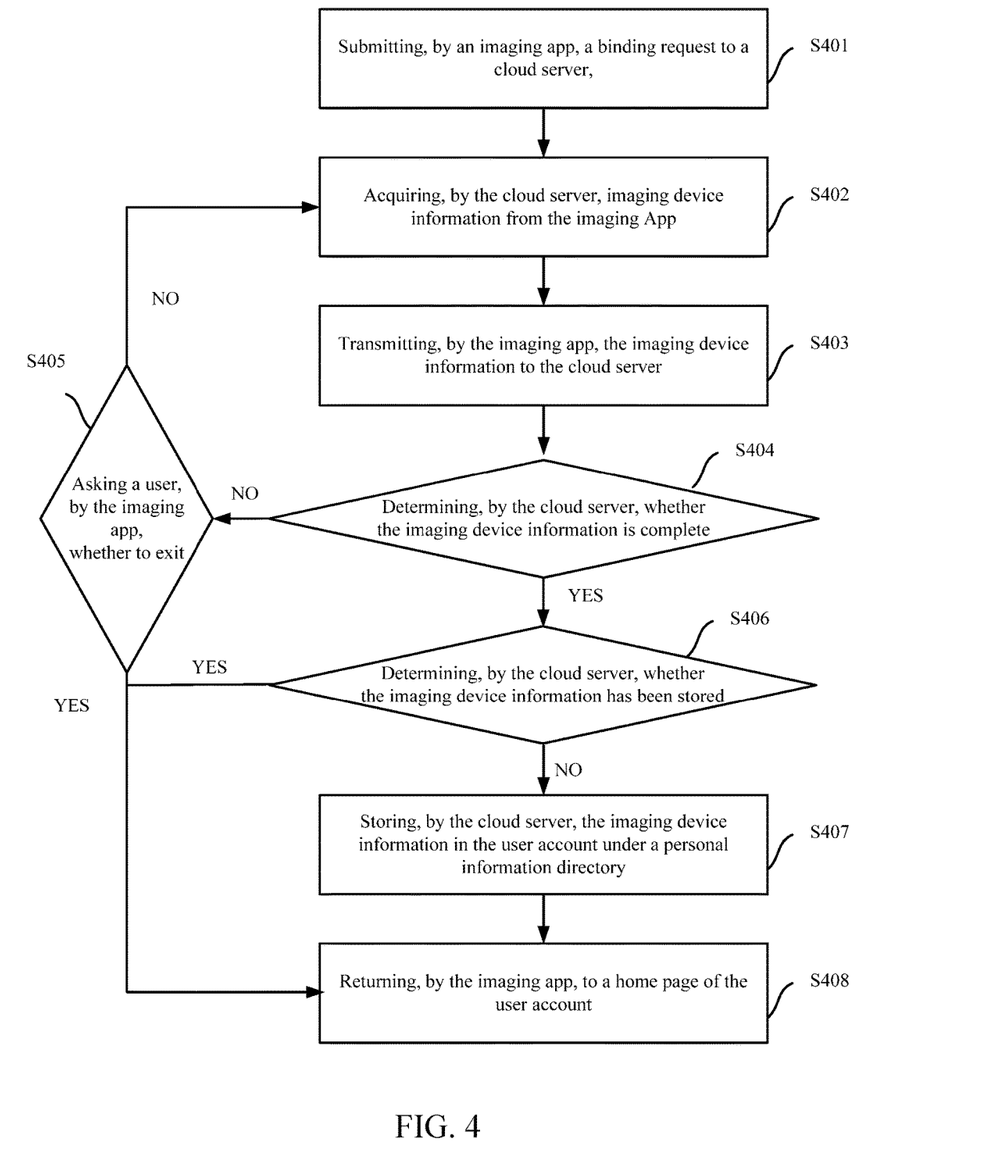
FIG. 4 illustrates a flow chart of an exemplary method for binding a user account to an imaging device consistent with disclosed embodiments.

The detailed steps of the binding process may be referred to FIG. 4 and the corresponding description.

Second Embodiment

Figure 2:
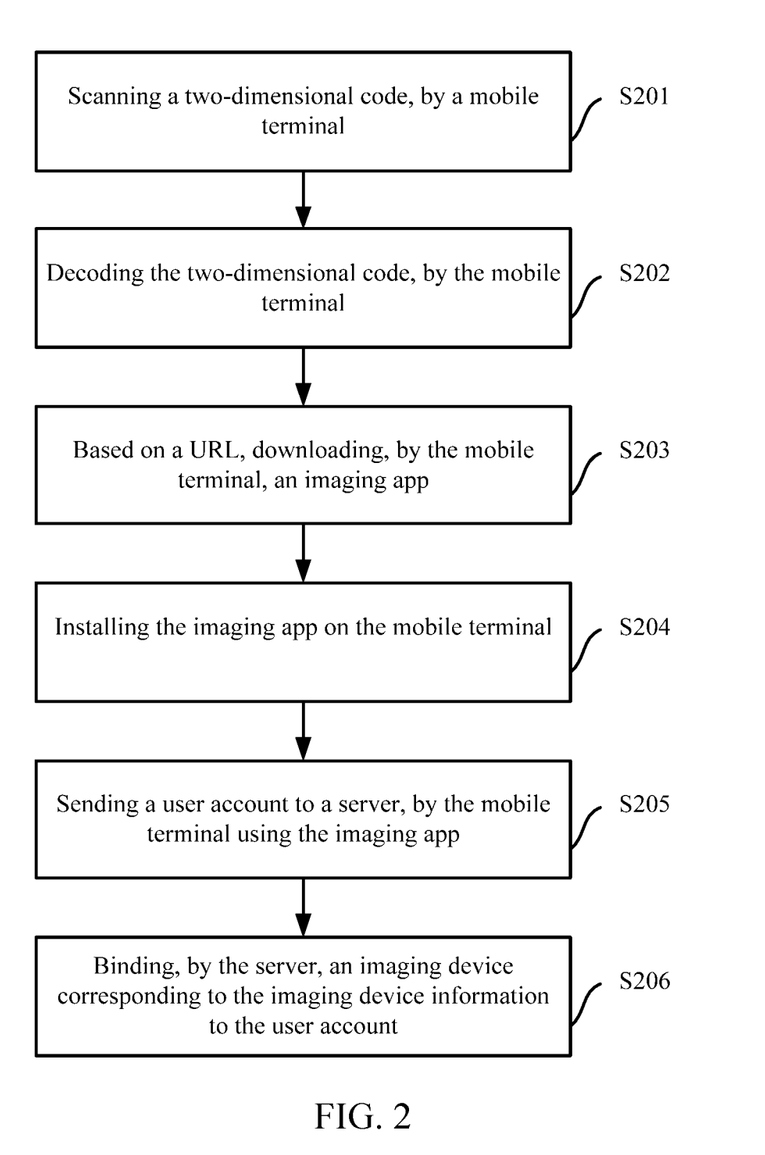
FIG. 2 illustrates a flow chart of another exemplary method for binding user account to imaging device by mobile terminal consistent with disclosed embodiments.

In one embodiment, before the mobile terminal 40 transmits the user account to the server 10, the mobile terminal 40 may also access the web page corresponding to the URL information contained in the two-dimensional code; and the user may download and install the imaging app.

FIG. 2 illustrates a flow chart of an exemplary method for binding user account to imaging device by mobile terminal according to the second embodiment. The method will be illustrated in detail below in conjunction with the accompanying FIG. 2.

Step S201, the mobile terminal 40 scans a two-dimensional code.

Step S202, the mobile terminal 40 decodes the two-dimensional code.

Steps S201 and S202 may be substantially the same as Step S101 and Step S102 in the first embodiment, and certain difference may be explained as follows. In Step S202, the information obtained from decoding the two-dimensional code by the mobile terminal 40 may include not only the imaging device information but also the URL for downloading the imaging app.

Step S203, the mobile terminal 40 downloads the imaging app according to the URL.

After obtaining the URL from decoding the two-dimensional code, the imaging app may be downloaded by automatically starting the browser to access the URL included in the two-dimensional code. The URL may direct to a web page prompting to download the imaging app, or direct to the download address of the imaging app.

In particular, after the mobile terminal 40 decodes the two-dimensional code, the URL information for downloading the imaging app may be extracted, which may be automatically adopted to download the imaging app. For example, the browser of the mobile terminal 40 may be automatically opened, through which a web page corresponding to the URL for downloading the imaging app may be accessed. In another embodiment, after extracting the URL information, the browser of the mobile terminal 40 may be manually opened by the user, and the extracted URL information may be input to the browser address bar to access the web page designated by the URL. At this moment, optionally, the URL information saved in the cache of the mobile terminal 40 may be deleted. The user may download the imaging app by clicking the "Download" link/button in the web page corresponding to the URL.

Step S204, the mobile terminal 40 installs the imaging app. The imaging app may be an application program for executing a printing task on the mobile terminal 40. The imaging app may perform various operations on the print data, such as data analysis, format conversion, and formatting, etc., such that the printing data may be output on the imaging device 20.

Step S205, the mobile terminal 40 transmits a user account to the server 10 through the imaging app. In practical applications, Step S205 may be performed when the user is logging in.

In Step S204, after the user installs the imaging app, the user may click the "OK" button and, accordingly, the system may automatically exit the app installation program, automatically start the app, and display the login interface. Then the user may log in to the server 10 using the account and password registered in advance on the server 10. In another embodiment, after the system exits the app installation program, the user may manually start the app to display the login interface, and then log in to the server 10.

Step S206, the server 10 binds the imaging device 20 corresponding to the imaging device information to the user account, based on the user account received from the mobile terminal 40 and the imaging device information acquired from the two-dimensional code.

The imaging device 20 may be bound to the user account. After the user logs in to the server 10, the imaging app may automatically redirect to the binding page of the user account, and automatically submit the binding request, for binding the imaging device 20 to the user account, to the cloud server 10, or the user may manually submit the binding request to the cloud server 10.

The detailed steps of the binding process may be referred to FIG. 4 and the corresponding description.

Third Embodiment

Figure 3:
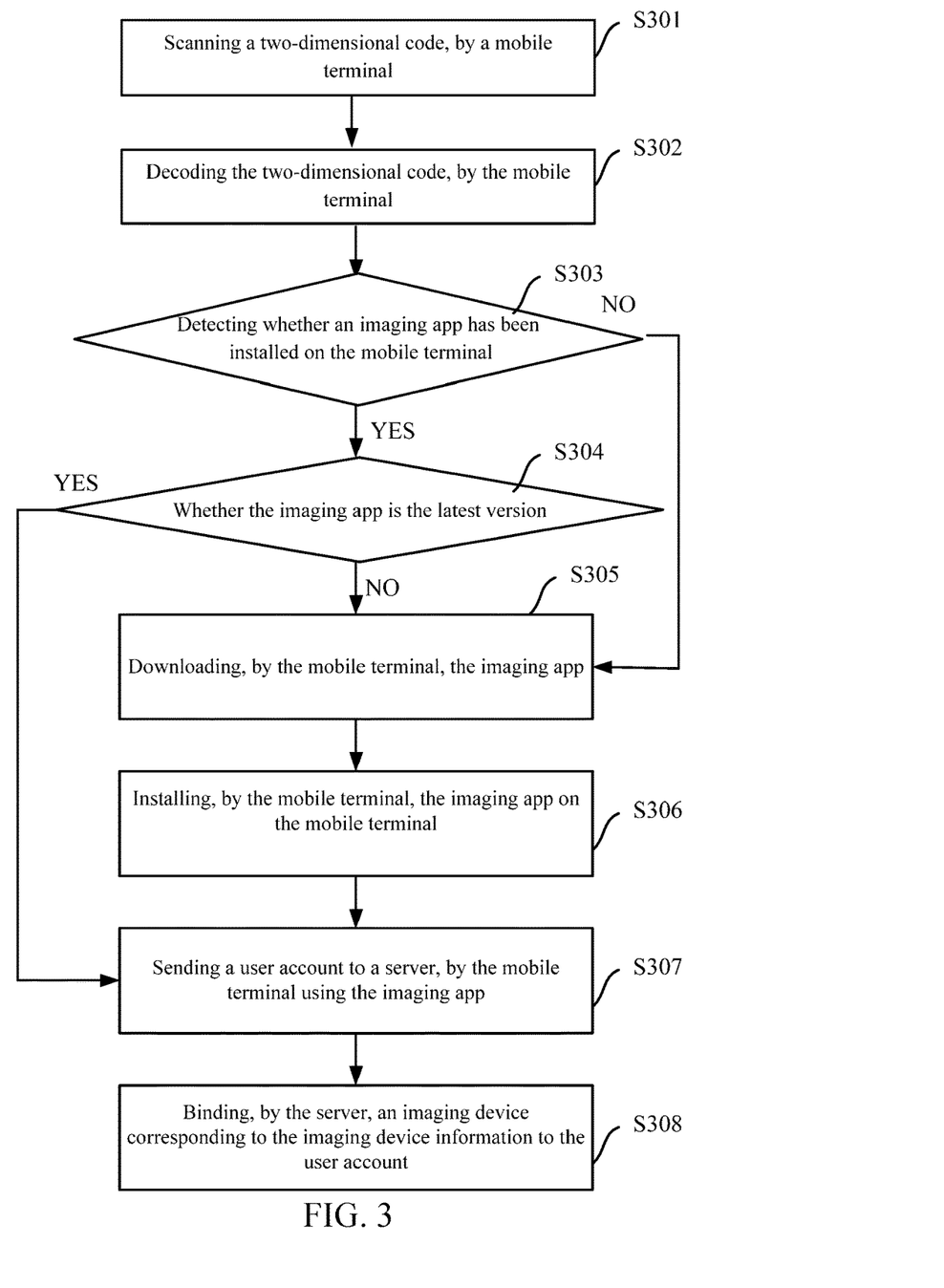
FIG. 3 illustrates a flow chart of another exemplary method for binding user account to imaging device by mobile terminal consistent with disclosed embodiments.

In the disclosed embodiments, based on automatic detection information obtained by decoding the two-dimensional code, the mobile terminal 40 may detect at least one of whether the imaging app has been installed on the mobile terminal 40 and whether the installed imaging app is the latest version. Only when the imaging app is detected to be not installed or the installed imaging app is detected to be not the latest version, the imaging app may be downloaded based on the URL information obtained from decoding the two-dimensional code.

FIG. 3 illustrates a flow chart of an exemplary method for binding user account to imaging device by mobile terminal according to the third embodiment. The method will be illustrated in detail below in conjunction with the accompanying FIG. 3.

Step S301, the mobile terminal 40 scans a two-dimensional code.

Step S302, the mobile terminal 40 decodes the two-dimensional code.

Steps S301 and S302 may be substantially the same as Step S201 and Step S202 in the second embodiment, and certain differences may be explained. In the disclosed embodiments, in Step S302, the information obtained from decoding the two-dimensional code by the mobile terminal 40 may include not only the imaging device information, but also the automatic detection information for detecting whether the imaging app has been installed.

Step S303, based on the automatic detection information, the mobile terminal 40 detects whether the imaging app has been installed on the mobile terminal 40.

After the mobile terminal 40 decodes the two-dimensional code, the mobile terminal 40 may acquire the automatic detection information included in the device information, to start the detection program in the system of the mobile terminal 40, thereby detecting whether or not the imaging app has been installed on the mobile terminal 40.

For example, the detection program in the mobile terminal 40 may determine whether an imaging app has been installed by querying the system registry or querying the installed program list. When the registration of the imaging app is found in the system registry or in the installed program list, the result of the determination is "YES", and the process proceeds to step S304. When the registration of the imaging app is not found in the system registry or in the installed program list, the result of the determination is "NO", and the process proceeds to step S305.

The imaging app may be an application program for executing a printing task on the mobile terminal 40. The imaging app may perform various operations on the printing data, such as data analysis, format conversion, and formatting, etc., such that the printing data may be output on the imaging device 20.

Step S304, whether the imaging app is the latest version is determined.

In Step S304, the version detection program in the imaging app may be automatically connected to the network to obtain the latest imaging app version information, such as the version number of the imaging app, which may be compared with the version information of the installed imaging app. When the acquired version number is higher than the version number of the installed imaging app, the result of the determination is "NO", and the process proceeds to step S305. When the acquired version number is equal to the version number of the installed imaging app, the result of the determination is "YES", and the process proceeds to step S307. When the version detection program in the imaging app fails to be connected to the network or the version number fails to be acquired or the acquired version number is lower than the version number of the installed imaging app, information of "failed to acquire the version information" is prompted, the result of the determination is "YES", and the process proceeds to step S307.

Step S305, the mobile terminal 40 downloads the imaging app.

Step S306, the mobile terminal 40 installs the imaging app.

Step S307, the mobile terminal 40 transmits a user account to the server 10 through the imaging app. In practical applications, Step S307 may be performed when the user is logging in.

In one embodiment, in Step S306, after the user installs the imaging app, the user may click the "OK" button, then the system may automatically exit the app installation program, automatically start the app, and display the login interface. In another embodiment, in Step S304, when the result of the determination is "YES", the system may automatically start the app to display the login interface, where the system may automatically exit the app installation program. In another embodiment, in Step S304, when the result of the determination is "YES", the user may manually start the app to display the login interface, and then log in to the server 10 using the account and password registered in advance on the server 10.

Step S308, based on the user account received from the mobile terminal 40 and the imaging device information acquired from the two-dimensional code, the server 10 binds the imaging device 20 corresponding to the imaging device information to the user account.

Steps S305, S306, and S308 may be substantially the same as Steps S203, S204 and S206 in the second embodiment and, thus, will not be described here.

The process of binding a user account to an imaging device according to the disclosed embodiments will explained by referring to FIG. 4.

Step S401, the imaging app submits a binding request to the cloud server 10. After the user logs in to the server 10, the imaging app may automatically redirect to the binding page of the user account, and automatically submit the binding request, for binding the imaging device 20 to the user account, to the cloud server 10. In another embodiment, the user may manually submit a binding request to the cloud server 10 by pressing a menu or a button or the like. That is, the mobile terminal 40 may be triggered, by a user click, to transmit the binding request to the server 10, or the imaging app of the mobile terminal 40 may automatically send a binding request to the server 10.

Step S402, the cloud server 10 acquires the imaging device information from the imaging app. In response to the binding request of the imaging app, the cloud server 10 may send an instruction to acquire the imaging device information to the imaging app. The imaging device information may include at least one of a device name, a device number, a print speed, a print resolution, a supported print mode (black and white print, or color printing) and, meanwhile, may at least include a device number.

Step S403, the imaging app transmits the imaging device information obtained by decoding the scanned two-dimensional code to the cloud server 10. The imaging app may transmit the imaging device information saved in the cache of the mobile terminal 40 to the cloud server 10.

Step S404, the cloud server 10 determines whether the imaging device information is complete. After receiving the imaging device information sent by the imaging app, the cloud server 10 may detect whether the received imaging device information includes necessary information, such as the device name, the device number, the print speed, the print resolution, and the supported print mode (black and white print or color printing), etc. When the received imaging device information is detected to include all the necessary information, the result of the determination is "YES", and the process proceeds to step S406. When the received imaging device information is detected to not include all the necessary information, the result of the determination is "NO", the instruction information "device information is incomplete" is displayed, and the process proceeds to step S405.

Step S405, the imaging app asks the user whether to exit the binding. When the user selects "Yes", the imaging app may delete the device information saved in the cache of the mobile terminal 40, and the process may proceed to step S408. When the user selects "NO", the process may proceed to Step S402 to acquire the device information again.

Step S406, the cloud server 10 further determines whether the imaging device information has been saved. The cloud server 10 may determine whether the imaging device 20 identified by the received imaging device information has been saved. When the imaging device 20 identified by the received imaging device information is determined to be saved, a message of "the current device is already bound" may be transmitted to the mobile terminal 40, and the process proceeds to step S408. When the imaging device 20 identified by the received imaging device information is determined to be not saved, the result of the determination is "NO", and the process proceeds to Step S407.

Step S407, the cloud server 10 saves the imaging device information in the user account under the personal information directory. The cloud server 10 may save the received imaging device information under the personal information directory of the user account, and the user may modify the imaging device information and delete the device at desired time.

Step S408, the imaging app returns to the home page of the user account. The imaging app may delete the imaging device information saved in the cache of the mobile terminal 40.

After the imaging device 20 is bound to the user account, the user may be able to select any one of the bundled imaging devices 20 through the user interface menu of the imaging app, thereby executing the printing task through the network at any place. The user may also be able to de-bind the bound imaging devices 20 (i.e., delete the imaging devices 20), rename the bounded devices 20 (for easy identification), modify the device information, and view print history, etc.

In the disclosed embodiments, the user may have to only scan the two-dimensional code, click to download and install the app, log in to the user account, while the mobile terminal 40 may automatically decode the two-dimensional code, determine whether the app has been installed in the mobile terminal 40, access the web page corresponding to the URL, and bind the imaging device 20 to the user account. Thus, the user operation may be significantly simplified, and the user experience may be significantly improved.

In addition, the information contained in the two-dimensional code may be encrypted. Thus, after the mobile terminal 40 decodes the two-dimensional code, the mobile terminal 40 may obtain the encrypted imaging device information, then decrypt the encrypted imaging device information to acquire the decrypted imaging device information. Thus, the security of scanning the two-dimensional code for wireless communication and the security of the information related to the imaging device may be enhanced.

Obviously, those skilled in the art should understand that the above-mentioned modules and steps of the disclosure can be implemented by the general-purpose calculating device; can be concentrated in a single calculating device, or distributed on the network comprised of a plurality of calculating devices. Alternatively, the modules and the steps of the present disclosure can be implemented by using the executable program code of the calculating device. Consequently, they can be saved in the storing device to be executed by the calculating device, or they can be manufactured into respective integrated circuit module respectively, or a plurality of modules or steps of them can be manufactured into single integrated circuit module to implement. In this way, the present disclosure is not limited to the combination of any specific hardware and software.

It should be noted that although the embodiments disclosed in the present disclosure are described above, the foregoing contents are merely the embodiments for facilitating understanding the present disclosure, rather than limiting the present disclosure. Therefore, any variations or substitutions readily conceivable by anyone familiar with this art within the disclosed technical scope of the present disclosure, or any modifications and variations made to the embodiments and details should be incorporated in the protection scope of the present disclosure.

What is claimed is:

1. A method for binding user account to imaging device by mobile terminal, comprising:
    scanning a two-dimensional code, by a mobile terminal;
    decoding the two-dimensional code, by the mobile terminal, to acquire decoded information comprising imaging device information;
    sending a user account to a server, by the mobile terminal;
    sending a binding request to the server, by the mobile terminal;
    based on the user account received from the mobile terminal and the imaging device information acquired from the two-dimensional code by the mobile terminal, binding in response to the binding request, by the server, an imaging device corresponding to the imaging device information to the user account, wherein:
    before binding in response to the binding request, by the server, an imaging device corresponding to the imaging device information to the user account, further include:
    in response to the binding request, determining whether the image device corresponding to the image device information has been stored by the server,
        if the server has stored the image device corresponding to the image device information, transmitting information to the mobile terminal that the image device is already bound; and
        if the server has not stored the image device corresponding to the image device information, based on the user account received from the mobile terminal and the imaging device information acquired from the two-dimensional code by the mobile terminal, binding, by the server, the imaging device corresponding to the imaging device information to the user account; and
    executing, by the mobile terminal, a printing task using the imaging device bound to the user account, wherein after binding the user account and the imaging device by the server, the printing task is able to be directly executed by the mobile terminal remotely using the imaging device and other previously bound imaging devices.

2. The method according to claim 1, further including:
    after decoding the two-dimensional code, by the mobile terminal, to acquire the decoded information comprising the imaging device information, based on the decoded information, automatically starting or downloading an imaging app for executing a printing task; and when the mobile terminal sends the user account to the server, sending, by the imaging app in the mobile terminal, the user account to the server when the user is logging in.

3. The method according to claim 1, wherein:

the imaging device information includes at least one of a device name, a device number, a print speed, a print resolution, a supported print mode, and at least includes a device number.

4. The method according to claim 1, wherein decoding the two-dimensional code, by the mobile terminal, to acquire decoded information comprising imaging device information, further includes:

decoding the two-dimensional code, by the mobile terminal, to obtain encrypted imaging device information; and decrypting the encrypted imaging device information to obtain decrypted imaging device information.

5. The method according to claim 4, further including:

after sending the user account to the server by the mobile terminal, triggering, by a user click, an imaging app in the mobile terminal to transmit a binding request to the server; or automatically transmitting, by the imaging app in the mobile terminal, a binding request to the server.

6. The method according to claim 5, wherein binding, by the server, an imaging device corresponding to the imaging device information to the user account further includes:

in response to the binding request, by the server, binding the imaging device corresponding to the imaging device information to the user account, according to the user account received from the mobile terminal and the imaging device information acquired from the two-dimensional code, wherein the binding request includes the imaging device information acquired from the two-dimensional code.

7. The method according to claim 5, wherein binding, by the server, an imaging device corresponding to the imaging device information to the user account further includes:

in response to the binding request, sending, by the server, an instruction to acquire the imaging device information to the mobile terminal;

in response to the instruction, sending, by the mobile terminal, the imaging device information obtained from decoding the two-dimensional code to the server; and after receiving, by the server, the imaging device information, binding the imaging device corresponding to the imaging device information to the user account, according to the user account received from the mobile terminal and the imaging device information.

8. The method according to claim 4, further including:

decoding the two-dimensional code, by the mobile terminal, to obtain an URL for downloading an imaging app; and based on the URL, downloading the imaging app.

9. The method according to claim 8, based on the URL, downloading the imaging app, further includes:

after obtaining the URL from decoding the two-dimensional code by the mobile terminal, automatically downloading the imaging app based on the URL, wherein the URL directs to a web page prompting to download the imaging app, or to a downloading address of the imaging app.

10. A method for binding user account to imaging device by mobile terminal, comprising:

scanning a two-dimensional code, by a mobile terminal;

decoding the two-dimensional code, by the mobile terminal, to acquire decoded information comprising imaging device information, obtain encrypted imaging device information, obtain decrypted imaging device information, obtain an URL for downloading an imaging app, and obtain automatic detection information for detecting whether the imaging app has been installed on the mobile terminal or whether the installed imaging app is a latest version;

based on the automatic detection information, detecting, by the mobile terminal, at least one of whether the imaging app has been installed on the mobile terminal and whether the installed imaging app is the latest version; and after determining the imaging app has not been installed or the installed imaging app is not the latest version, downloading the imaging app based on the URL sending a user account to a server, by the mobile terminal;

based on the user account received from the mobile terminal and the imaging device information acquired from the two-dimensional code by the mobile terminal, binding, by the server, an imaging device corresponding to the imaging device information to the user account; and executing, by the mobile terminal, a printing task using the imaging device bound to the user account.

11. A system for binding user account to imaging device by mobile terminal, comprising: at least one mobile terminal, a server and at least one imaging device, wherein the server is coupled to the at least one imaging device through a data connection and, meanwhile, coupled to the at least one mobile terminal through a data connection, wherein:

the at least one mobile terminal is configured to scanning a two-dimensional code;

the at least one mobile terminal is configured to decode the two-dimensional code, to acquire decoded information comprising imaging device information;

the at least one mobile terminal is configured to send a user account to the server and send a binding request to the server;

based on the user account received from the at least one mobile terminal and the imaging device information acquired from the two-dimensional code by the at least one mobile terminal, the server is configured to bind, in response to the binding request, the at least one imaging device corresponding to the imaging device information to the user account, wherein:

before binding in response to the binding request, by the server, an imaging device corresponding to the imaging device information to the user account, further include:

in response to the binding request, determining whether the image device corresponding to the image device information has been stored by the server, if the server has stored the image device corresponding to the image device information, transmitting information to the mobile terminal that the image device is already bound; and if the server has not stored the image device corresponding to the image device information, based on the user account received from the mobile terminal and the imaging device information acquired from the two-dimensional code by the mobile terminal, binding, by the server, the imaging device corresponding to the imaging device information to the user account; and the at least one mobile terminal is configured to execute a printing task using the at least one imaging device bound to the user account, wherein after binding the user account and the imaging device by the server, the printing task is able to be directly executed by the mobile terminal remotely using the imaging device and other previously bound imaging devices.

12. The system according to claim 11, wherein:

after the at least one mobile terminal is configured to decode the two-dimensional code to acquire decoded information comprising imaging device information, the at least one mobile terminal is further configured to, based on the decoded information, automatically start or download an imaging app for executing a printing task; and when the mobile terminal sends the user account to the server, the imaging app in the mobile terminal is configured to send the user account to the server when the user is logging in.

13. The system according to claim 11, wherein:

the imaging device information includes at least one of a device name, a device number, a print speed, a print resolution, a supported print mode, and at least includes a device number.

14. The system according to claim 11, wherein when the at least one mobile terminal is configured to decode the two-dimensional code to acquire decoded information comprising imaging device information, the at least one mobile terminal is further configured to:

decode the two-dimensional code to obtain encrypted imaging device information; and decrypt the encrypted imaging device information to obtain decrypted imaging device information.

15. The system according to claim 14, wherein:

after the mobile terminal sends the user account to the server, an imaging app in the mobile terminal is triggered by a user click to transmit a binding request to the server; or a binding request is automatically transmitted to the server by the imaging app in the mobile terminal.

16. The system according to claim 15, wherein when the server is configured to bind the at least one imaging device corresponding to the imaging device information to the user account, the server is further configured to:

in response to the binding request, bind the imaging device corresponding to the imaging device information to the user account, according to the user account received from the mobile terminal and the imaging device information acquired from the two-dimensional code, wherein the binding request includes the imaging device information acquired from the two-dimensional code.

17. The system according to claim 15, wherein:

when the server is configured to bind the at least one imaging device corresponding to the imaging device information to the user account, the server is further configured to, in response to the binding request, send an instruction to acquire the imaging device information to the mobile terminal;

the mobile terminal is further configured to, in response to the instruction, send the imaging device information obtained from decoding the two-dimensional code to the server; and after the server receives the imaging device information, the server is further configured to bind the imaging device corresponding to the imaging device information to the user account, according to the user account received from the mobile terminal and the imaging device information.

18. The system according to claim 14, wherein the mobile terminal is further configured to:

decode the two-dimensional code, to obtain an URL for downloading an imaging app; and based on the URL, download the imaging app.

* * * * *